INVENTOR.
THELMA L. BYRUM
ATTORNEY

March 13, 1962 T. L. BYRUM 3,024,541
SPELLING BOARD

Filed Feb. 24, 1960 2 Sheets-Sheet 2

INVENTOR.
THELMA L. BYRUM
BY
*W. B. Harpman*
ATTORNEY

United States Patent Office 3,024,541
Patented Mar. 13, 1962

3,024,541
SPELLING BOARD
Thelma L. Byrum, 252 S. Sycamore St., Hollywood, Calif.
Filed Feb. 24, 1960, Ser. No. 10,725
1 Claim. (Cl. 35—35)

This invention relates to an educational toy and more particularly to a spelling board for children which provides a plurality of movable sections carrying the letters of the alphabet together with means for receiving several of such sections adjacent means on which the child can write.

The principal object of the invention is a provision of a spelling board of inexpensive, attractive, construction providing a plurality of easily removable sections and means for receiving these sections in desired sequence.

A further object of the invention is the provision of a spelling board wherein a flat sheet-like section of material has a plurality of depressions formed therein and a plurality of sections of material positioned one in each of said depressions in a removable manner.

A further object of the invention is a provision of a spelling board wherein an arrangement of individual flat blocks are received by the board and retained thereby in a removable manner and wherein the board includes alternative locations for said flat blocks so that they can be removed thereto to spell out a word when the blocks are provided with the letters of the alphabet.

The spelling board disclosed herein comprises a simple and efficient educational toy possessing a structure which has removable portions easily handled by a child so that the removable portions when individually provided with individual letters of the alphabet may be used by the child in forming words. The board provides means for locating and retaining individual sections selected by the child and grouped to form a word and also provides a blackboard section immediately adjacent thereto so that the child may then copy the word formed by the letters on the selected sections. The device may be constructed economically of paperboard and, therefore, sold at nominal cost, so as to make it readily available to children working with letters in the formation of words as advocated by educators teaching modified word recognition reading so that the child learns the letter contents of the word as well as the picture of the word.

With the foregoing and other objects in view which will appear as the description proceeds, the invention resides in the combination and arrangement of parts and in the details of construction hereinafter described and claimed, it being the intention to cover all changes and modifications of the example of the invention wherein chosen for purposes of the disclosure, which do not constitute departures from the spirit and scope of the invention.

The invention is illustrated in the accompanying drawing, wherein.

Figure 1:
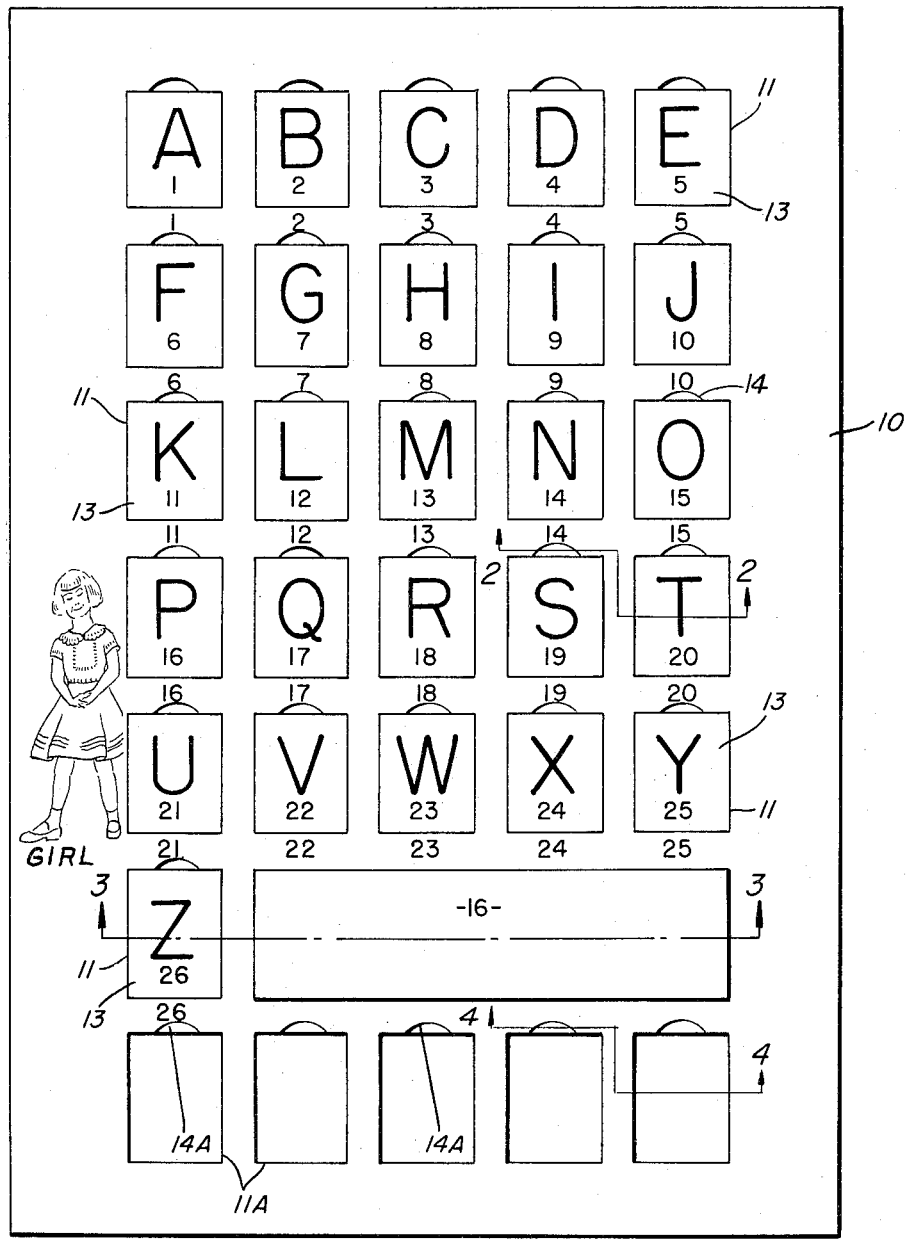
FIGURE 1 is a plan view of the spelling board.
Figure 2:
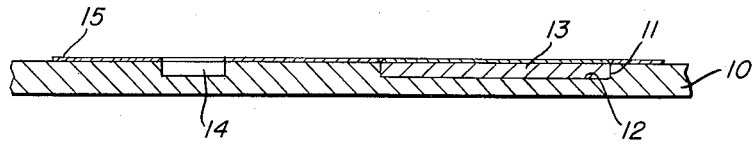
FIGURE 2 is an enlarged cross sectional detail on line 2—2 of FIGURE 1.

By referring to the drawings and FIGURE 1 in particular it will be seen that a board 10 has been disclosed which is preferably formed of paperboard approximately three eighths of an inch in thickness. A plurality of rectangular depressions 11 are formed in the board 10 each of the depressions 11 extending downwardly into the board approximately one-half way therethrough as best seen in FIGURE 2 of the drawings. The depressions 11 are square cut and have flat bottom portions 12 and are adapted to receive rectangular sections 13 of cardboard or a similar material each of which is slightly smaller in over all size than any one of the depressions 11. It will thus be seen that, as illustrated in FIGURE 1, each of the sections 13 which also carry indicia comprising the individual letters of the alphabet and the numerals 1 through 26, are positioned one in each of the depressions 11 in such manner that they are retained therein in easily removable relation. In order that the sections 13 may be removed openings 14 are formed in each of the depressions 11 as best seen in FIGURE 2 of the drawings, so that a child may move an individual section 13 upwardly with a finger engaged in the opening 14.

The uppermost surface of the board 10 comprises a lithographed or printed sheet 15 which is decorated in several colors and may, and preferably does, include pictures of several objects with the word names thereof printed adjacent thereto. By again referring to FIGURE 1 it will be seen that there are twenty-six of the depressions 11 and that they are arranged on six lines wherein they form five complete lines of five depressions each with one depression on the sixth line, which depression 11 receives a section 13 carrying the letter Z and the numeral 26. It will also be seen that the numerals 1 through 26 are printed on the upper surface of the board 10 immediately below each of the comparable depressions 11 in which the sections 13 are normally positioned.

Figure 3:
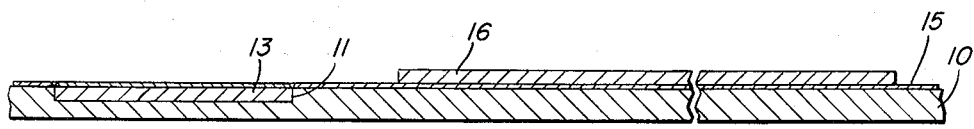
FIGURE 3 is an enlarged cross sectional detail on line 3—3 of FIGURE 1.

Adjacent to section 13 in the depressions 11 in the sixth line as illustrated in FIGURE 3 of the drawings there is a section of blackboard material 15 such as Fiberglas or a resin impregnated fiber or paper such as suitable for marking with a piece of chalk. As disclosed in FIGURE 3 of the drawing, the section of blackboard material 16 is secured to the upper surface of the board 10 above the lithographed sheet 15 by suitable adhesive.

Figure 4:
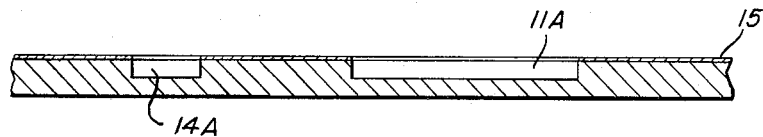
FIGURE 4 is an enlarged cross sectional detail on line 4—4 of FIGURE 1.

Immediately below the section of blackboard material 15 are a plurality of depressions 11A each of which has an adjacent opening 14A. The series of depressions 11A are arranged in a seventh line across the board and are intended to receive individual sections 13 which are removed from the depressions 11 as hereinbefore described. In FIGURE 4 of the drawings the enlarged cross section illustrates the depressions 11A and the openings 14A and it will occur to those skilled in the art that a child may remove the sections 13 from the depressions 11 as heretofore described and position them in the depressions 11A to form a word having up to and including five letters. For example, the word "girl" can be formed by removing sections 13 carrying the letters G I R L and positioning them in the depressions 11A from left to right so that the complete four-letter word "girl" appears therein. The child using the board may then copy this word by drawing it on the blackboard section 16 immediately thereabove. Thus the board and the manipulation of the sections 13 causes the child to build the word from the individual letters of the alphabet and at the same time place the word in a familiar word recognition picture, while also enabling the child to make a copy of the word by drawing it on the blackboard 16.

It will thus be seen that a simple and efficient spelling board has been disclosed which may be economically formed of relatively inexpensive material and which presents an attractive and interesting appearance. The well-known attractiveness of blocks is present so that a child is immediately interested in removing the sections 13 and setting them or replacing them in the depressions 11 and the letter indicia thereon enables the child to form words which as hereinabove noted may be suggested by picture representations with the accompanying word names as printed on the margin of the board. In FIGURE 1 such a printed picture and word name appears and it will occur to those skilled in the art that many familiar objects well known to the child and thereby easily recognizable may be pictured around the margin of the board so that the mental association of the object and word may be readily created with the suggestion that the child form the same word with the sections 13 hereinbefore described. It will thus be seen that the spelling board disclosed herein meets the several objects of the invention and having thus described my invention what I claim is:

A spelling and writing device comprising a flat rectangular board having a plurality of rows of depressions in one side thereof extending downwardly into the board approximately one-half way therethrough, a plurality of rectangular alphabet sections of a size and shape to fit within said depressions so the top surfaces thereof are in substantially the same plane as the plane of said board to permit writing on said board, there being more depressions than alphabet sections so said alphabet sections may be rearranged within said depressions, said board having openings therein adjacent each depression for facilitating removal of said sections, said board having a portion thereof free of said depressions between two rows of depressions to receive writing thereon, the rows of depressions substantially above said portion comprising a storage area for the alphabet sections from which a word is formed, the depressions substantially below said portion comprising a work area for forming a word therein to be written on said board, and a strip of blackboard paper secured over said portion to receive writing thereon between said rows of depressions.

References Cited in the file of this patent

UNITED STATES PATENTS

| | | |
|---|---|---|
| 343,164 | Eller | June 8, 1886 |
| 1,946,318 | Hamilton | Feb. 6, 1934 |
| 2,547,259 | Englehardt | Apr. 3, 1951 |
| 2,681,804 | Stover | June 22, 1954 |
| 2,852,863 | Homan | Sept. 23, 1958 |